United States Patent [19]

Gherardi et al.

[11] Patent Number: 4,755,373
[45] Date of Patent: Jul. 5, 1988

[54] TITANATES IN THE FORM OF SPHERICAL PARTICLES AND PROCESS FOR PREPARING THE SAME

[75] Inventors: Paola Gherardi, Novara, Italy; Egon Matijevic, Potsdam, N.Y.

[73] Assignee: Montedison S.p.A., Milan, Italy

[21] Appl. No.: 895,871

[22] Filed: Aug. 12, 1986

[30] Foreign Application Priority Data

Aug. 12, 1985 [IT] Italy .............................. 21921 A/85

[51] Int. Cl.$^4$ ............................................. C01G 23/00
[52] U.S. Cl. .................................. 423/598; 423/592; 423/593
[58] Field of Search ................ 423/592, 593, 598, 608

[56] References Cited

U.S. PATENT DOCUMENTS

| | | | |
|---|---|---|---|
| 4,061,583 | 12/1977 | Murata et al. | 423/598 |
| 4,520,004 | 5/1985 | Uedaira et al. | 423/598 |
| 4,534,956 | 8/1985 | Arendt et al. | 423/598 |

FOREIGN PATENT DOCUMENTS

| | | | |
|---|---|---|---|
| 141551 | 5/1985 | European Pat. Off. | 423/598 |
| 2433279 | 9/1975 | Fed. Rep. of Germany | 423/598 |
| 9069599 | 10/1972 | Japan | 423/598 |
| 8064218 | 4/1983 | Japan | 423/598 |

OTHER PUBLICATIONS

K. S. Mazdiyasni, "Fine Particle Perovskite Processing", Am. Ceram. Soc. Bull., vol. 63, No. 4, (1984).
R. F. Davis et al., "Emergent Process Methods for High-Technology Ceramics", Materials Science Research, vol. 17, (1984).
R. L. Prober et al., "Dispersion and Packing of Narrow Size Distribution Ceramic Powders."
L. Hench et al., "Ultrastructure Processing Ceramics, Glasses and Composites," John Wiley and Sons, (1984), Chap. 2.

*Primary Examiner*—Asok Pal
*Attorney, Agent, or Firm*—Stiefel, Gross & Kurland

[57] ABSTRACT

Titanates of barium, strontium, or mixed barium and strontium consisting essentially of solid, non-aggregated particles having diameters ranging from 0.05 to 1 micron and a narrow particle size distribution expressed by the polydispersity index, dw/dn, not greater than 1.20, where dw is the weight average diameter and dn is the number average diameter, said particles being essentially perfectly spherical with a total mean axial ratio of at least 0.93. These titanates are prepared by a process which comprises precipitating of a peroxidic precursor having the same morphological characteristics of the titanates. The peroxidic precursor is obtained by heating an alkaline solution comprising a complex of a titanium compound with a peroxidic compound, an $M^{2+}$ compound, wherein M is Ba, Sr or mixtures thereof, and a compound Z capable of complexing with the $M^{2+}$ ion oxidizable by the peroxidic compound under the conditions of reaction to produce soluble decomposition products and provide a homogeneous precipitation of the peroxidic precursor comprising titanium and $M^{2+}$. Subsequently the precursor is heated to a temperature of at least 100° C. to obtain the corresponding titanate having the above-indicated morphological characteristics.

21 Claims, 6 Drawing Sheets

TITANATES IN THE FORM OF SPHERICAL PARTICLES AND PROCESS FOR PREPARING THE SAME

BACKGROUND OF THE INVENTION

1. Field of the Invention

The present invention relates to barium titanates, strontium titanates, or mixed barium and strontium titanates, consisting essentially of solid, spherical, non-aggregated particles, and to a process for their preparation More particularly, this invention relates to a new powder of the foregoing titanate consisting essentially of nearly perfect spherical particles having a very narrow particle size distribution (monodispersed powders), having a diameter ranging from 0.05 to 1 micron (micrometer), and exhibiting good dispersibility.

2. Description Of The Prior Art

Titanates have a broad range of uses, such as, for example, as ceramics for electronic components, such as, for instance, dielectric ceramics, piezoelectric ceramics, semiconductive ceramics, pyroelectric ceramics, etc.

A number of these applications are cited, for example, in "Fine Particle Perovskite Processing" by K. S. Mazdiyasni, Vol. 63, No. 4 (1984), page 591, Am. Ceram. Soc. Bull.

As is well known, in the preparation of sintered parts for general electronic uses, it is necessary that the titanate be present in the form of spherical particles, that the particle size not exceed 1 micron in diameter, and that the particles not be in the form of aggregates, so as to have good dispersibility in order to obtain uniform sintering during the preparation of ceramic bodies, with consequent uniformity of the density of the packed or pressed powder (green density).

One of the main problems in obtaining high-technology ceramics is securing a starting powder which can be used to obtain ceramic systems with high reproducibility and reliability.

It is well known that the degree of reproducibility is related to the ability to control the microstructures in the sintered bodies which, as is also known, depends on the characteristics of the starting material.

If the particles have essentially a perfectly spherical form and a narrow particle size distribution (monodispersed particles), the reproducibility characteristics are markedly improved.

In brief, the basic starting powder parameters which enable one to obtain high-technology ceramic systems are:

the particle diameter, which must not exceed 1 $\mu$m (1 micron);

the particle size distribution, dw/dn, which should be as narrow as possible, dw/dn not exceeding 1.20, as defined hereinafter;

the particle shape, which should exhibit essentially perfect sphericity; and the particle agglomeration, which should be essentially absent.

A powder having all the above characteristics permits a uniform packing of the particles so as to minimize voids between the particles, whereby the resulting density of the packed or pressed powder exhibits maximum uniformity.

Such uniform packing and density provide several advantages, including shorter sintering times, lower sintering temperatures, and a more uniform shrinkage as reflected by a uniform densification of the microstructure, with the final density of the system approaching the theoretical density.

As previously noted, all of the foregoing advantages are a function of the characteristics of the starting powder. This is well known and is described in detail in various scientific articles, including "Emergent Process Methods for High-Technology Ceramics", Materials Science Research, Vol. 17 (1984 Ed.) Robert F. Davis et al, Plenum Press, New York and London; R. L. Pober et al, "Dispersion and Packing of Narrow Size Distribution Ceramic Powders," page 193; "Ultrastructure Processing Ceramics, Glasses and Composites," Larry Hench and Donald R. Ulrich, Editors, John Wiley & Sons, (1984 Ed.), Chapter 2, page 6. However, titanate powders having a combination of all of the characteristics referred to above have not been obtained in the art.

The desired high-technology ceramic systems can only be obtained by syntheses methods which result in powders which exhibit the indicated combination of characteristics. The classification methods which can be utilized and are presently utilized to obtain powders consisting of particles having approximately the same diameter do not in fact enable one to obtain monodispersed particles. This has been ascertained for various powders (other than barium titanate, which is not presently available in the art in the form of monodispersed spherical particles) such as, for example, titanium dioxide. See FIG. 4 at page 200 of the R. L. Pober article previously cited.

Many processes are known for preparing barium titanate, for example:

reaction, in the solid phase, of a barium compound, for example, a nitrate, oxalate, oxide, or carbonate, with $TiO_2$;

thermal decomposition of complex salts of barium and titanium such as oxalates or citrates, obtained by reaction in the liquid phase; and aging of a titanium gel in the presence of barium hydroxide at such concentrations as to obtain a strongly basic pH, by operating at temperatures ranging from 60° to 100° C. or higher.

By these known processes it is not possible, as already noted, to obtain spherical, monodispersed particles. A titanate from a precursor consisting of a complex salt of the oxalate requires high decomposition temperatures. This causes a caking of the particles, with the consequent drawbacks mentioned above. Further, the particles generated from a precursor complex do not exhibit a spherical morphology.

By reacting the above indicated compounds in the solid phase there are obtained agglomerated products, because the reaction must be carried out at high temperatures. Moreover, the particles are not spherical in form and have sizes in excess of 1 micron. They therefore require grinding post-treatments, which always give rise to highly impure polydispersed products. Other liquid-phase preparation methods are known, such as, for example, the method described in U.S. Pat. No. 4,061,583, in which there is used, as a precursor of the titanate, a peroxide complex which is converted to the titanate by heating to a temperature equal to or in excess of 100° C. This process leads to products with sizes below 1 micron, but without the spherical form.

In published European patent application E.P. No. 141,551 there is described a method of preparing various titanates, in particular of BaTiO3, from a gel as described above, resulting in BaTiO3 particles having a more defined morphology than products previously known in the art, but which are not spherical. This method, which utilizes a heterogeneous system in which one of the components is in the solid phase, makes it difficult to control the morphology, although it does permit the utilization of much lower temperatures than when carrying out reactions in the solid phase. Further, the resulting titanate is in the form of polydispersed particles. The lack of perfect sphericity as well as the wide distribution of particle diameters results in the drawbacks previously described.

Figure 8:
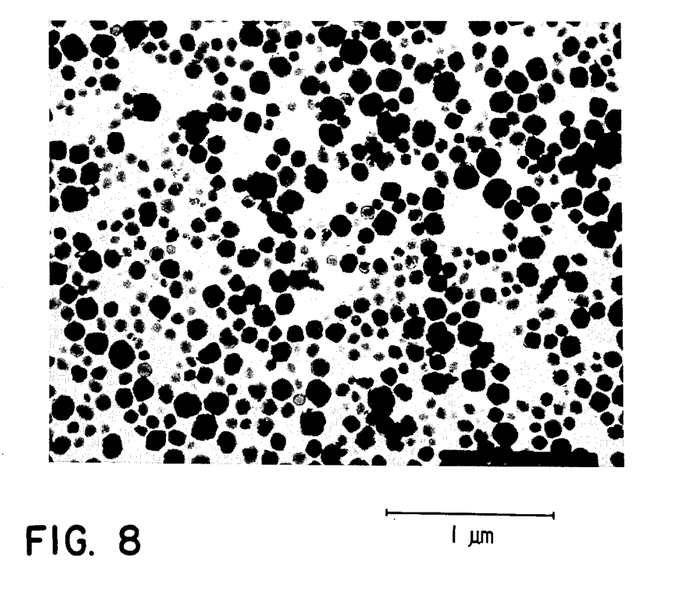
FIG. 8 shows particles obtained by a prior art procedure at a magnification of 36,700X.
Figure 9:
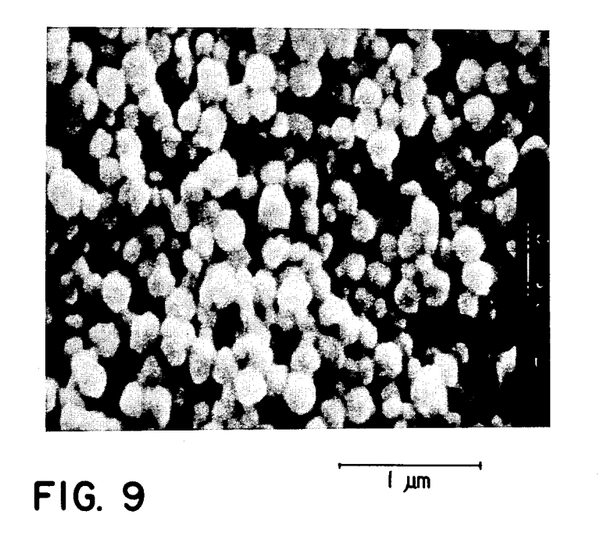
FIG. 9 shows the particles of said prior art procedure at a magnification of 30,000X.

We repeated Example 1 of patent application EP No. 141,551. The results by examination with a transmission electron microscope (TEM) are shown in FIG. 8 (36,700 magnification), and in FIG. 9 by examination with a scanning electron microscope (SEM) (30,000 magnification). The diameter of the particles is 0.11 $\mu$m, dw/dn is equal to 1.36, and the total mean axial ratio is 0.836.

From the powders obtained according to the methods of this European patent application it is not possible to prepare very thin films with regular microstructures, and therefore it is also not possible to obtain ceramic bodies having a high uniformity. This is a serious limitation of these powders, since it does not permit their use, for example, to produce high capacity capacitors. Further, the polydispersity adversely affects all of the subsequent molding steps used in making ceramic bodies because the stability of the dispersions is not constant over a period of time due to the coagulation of the smaller particles with the larger particles (Ostwald ripening). This effect results in a further worsening of the packing with a consequent major decrease in densification.

In addition, in packed products obtained by sedimentation, using gravity or centrifugation, a polydispersed product, because of the different particle sedimentation velocities, results in non-uniform, stratified films. This is described in detail in the previously cited articles.

Further, the process employed in said European patent application requires one to operate in an entirely $CO_2$-free atmosphere. The presence of $CO_2$ would cause partial formation of $BaCO_3$ along with BaTiO3, resulting in composition nonhomogeneities and in considerable morphological irregularity of the titanate. The formation of $BaCO_3$ is to be avoided because it leads to agglomeration of the BaTiO3 powder. Temperatures of about 700° C. are required for its complete removal. Operating in an atmosphere free of $CO_2$ requires a lengthy period of time in order to obtain the final BaTiO3 product. This is apparent from the examples of said European patent application.

Thus, there has been a need for a simple method capable of providing titanates having the foregoing characteristics, primarily in the form of fully spherical, uniform particles.

SUMMARY OF THE INVENTION

We have now surprisingly found that it is possible to obtain titanates having the necessary characteristics for forming high-technology ceramic bodies by the process of the present invention.

The present invention provides a powder of barium titanate, strontium titanate, or of a mixed barium and strontium titanate, consisting essentially of solid non-aggregated particles exhibiting essentially a nearly perfect spherical form, having diameters ranging from about 0.05 to 1 micron and a very narrow particle size distribution expressed by a polydispersion index, dw/dn, not in excess of 1.20, in which dw is the weight average diameter and dn the number average diameter, said spherical particles having a total average axial ratio, D=a/b, of at least 0.930, in which b is the maximum diameter of each particle and a is the corresponding orthogonal diameter.

BRIEF DESCRIPTION OF THE DRAWINGS

Our invention will be best understood by reference to the following detailed description taken in conjunction with the accompanying drawings wherein.

DETAILED DESCRIPTION OF THE INVENTION

Preferably the polydispersity index of the titanates of this invention is not in excess of 1.10, and the diameter of the spherical particles ranges from about 0.15 to 0.5 $\mu$m. Powders having a polydispersity index not in excess of 1.20 are referred to as monodispersed powders. When the polydispersity index, dw/dn, is above 1.20 but not in excess of 1.30 the particles are considered as having a low polydispersity index. If dw/dn is in excess of 1.30 and up to 2.00, the powders are considered as polydispersed.

The average sizes, dw and dn, and the morphological and granulometric characteristics, are determined with a transmission electron microscope (TEM). The method of determining dw and dn is described by E. A. Collins, J. A. Davidson and C. A. Daniels in "Review of Common Methods of Particles Size Measurement," Journal of Paint Technology, Vol. 47, No. 604, May 1975.

The total average axial ratio was determined by calculating the arithmetic mean of the values obtained on a sample having a large number of particles. In the present invention, it was calculated by measuring the maximum diameter, b, of each particle, and the corresponding orthogonal diameter, a, for a sample made up of 300 particles.

The particle diameter, dn, was determined with the transmission electron microscope.

In addition to the TEM technique, the particle size distribution, dw/dn, was also determined, in addition to the use of the TEM technique, by Sedigraph curves by dispersing the powders in isopropyl alcohol. The data obtained from these two different methods are fully consistent.

In another aspect of the present invention, polydispersed titanates are provided having a polydispersity index, dw/dn, greater than 1.20 but not in excess of 2.0. These titanates retain such characteristics of the monodispersed products as sphericity and total average axial ratio. As previously pointed out, these polydispersed powders frequently are not particularly desirable for the above-cited electrontic applications. However, the nearly perfect sphericity of the particles gives results, when used in other conventional applications, which are superior to the results attainable with previous titanate powders, although inferior to the results obtained when using the monodispersed spherical powders of our invention.

The titanate powders of the present invention are amorphous. The Ba/Ti molar ratio can be adjusted so as to give a molar ratio of $1.00\pm0.04$ as determined by gravimetric and colorimetric analyses or by the atomic absorption technique.

However, for certain electronic applications, an excess of Ba or of Ti is provided so as to control the properties of the material during sintering. For example, a Ba excess in the calcined product enables one to limit the growth of the grains.

An excess of Ti ions enables one to obtain titanates that are more easily sinterable. The Ba/Ti molar ratio can be adjusted within values ranging from 0.60 to 1.10, within the above-reported limits of error.

The purity of the product is very high, generally greater than 98% by weight.

It is also possible to dope the titanates of our invention with doping agents of p or n type without modifying the morphology and the particle size distribution, using, for example, Al, Sn, Sb, Nb, Ta, Mn, Fe or rare earth elements.

The amount of doping agent present in the final product generally is of the order of 0.01% by weight or lower. Modified titanates are thereby obtained, the applications of which are well known in the literature, being a function of the electric characteristics of the particular doping agent, as reported, for example, in the previously cited article by K. S. Mazdiyasni.

Further applications of doped titanates are described in "Ceramic Multilayer Capacitors and Nonlinear Resistors" by R. Wernicke, page 677, Science of Ceramics 12.

The amorphous titanates can be utilized as is for such electronic applications, without the necessity of being transformed into the corresponding crystalline phases. The amorphous titanates are obtained directly during the sintering step, which is a further advantage of the present invention. Thus, aggregations which might occur if one carried out a calcining step to obtain the crystalline phases, are avoided.

However, if desired, the titanates of our invention can be transformed into crystalline titanates by calcining.

The titanates of the present invention are prepared by a process comprising the following steps:

(A) homogeneously precipitating a peroxide precursor comprising Ti(IV) and M(II), in which M is Ba, Sr or mixtures thereof, the precipitation being carried out as follows:

(a) preparing a clear solution at a pH of from about 9 to 11.5, this solution including a soluble complex of Ti with a peroxidic compound V, a solution of $M^{2+}$, in which M is defined as above, a compound Z capable of complexing $M^{2+}$ and capable of being oxidized by peroxidic compound V, thus giving rise to decomposition products which are soluble in the reaction medium;

(b) heating clear solution (a) in the presence of an excess of peroxidic compound V to effect homogeneous precipitation of the aforesaid peroxidic precursor; and (B) heating the peroxidic precursor (A) to a temperature of 100° C. or higher to form the corresponding amorphous titanates having the same morphology as that of peroxidic precursor (A).

For peroxidic compound V one may use any compound capable of forming complexes with the titanium ions. Preferably, hydrogen peroxide is employed.

As indicated, the complex between M and Z may be oxidized by peroxidic compound V, in order to give free ion $M^{2+}$, to precipitate the corresponding peroxidic precursor, or may be decomposed by a substance capable of reacting with Z in order to remove Z from the complex between M and Z giving free ion $M^{2+}$, to form the corresponding peroxidic precursor.

For compound Z one may use any compound capable of forming complexes with the M(II) ion and which may be oxidized by peroxidic compound V by means of heating, gradually releasing ion $M^{2+}$ from the complex, to thereby homogeneously precipitate the peroxy precursor (A) and wherein the oxidation product of compounds Z and V may be soluble in the reaction medium. Suitable examples of compound Z include, for example, ammonium, sodium and potassium salts of ethylenediaminotetraacetic acid (EDTA), nitrilo-triacetic acid (NTA), diethylenetriaminopentaacetic acid (DTPA), hydroxyethylenediaminotriacetic acid (HEDTA), cyclohexylenedinitrilotetraacetic acid (CDTA), and the like. Salts of EDTA are preferred. The corresponding acids of the above-cited salts are also suitable.

The expression "homogeneous precipitation" means precipitation carried out under such conditions as to provide a slow, gradual and uniform release of the M(II) ions in the solution and to avoid local supersaturation of the solution. In the process of our invention this is achieved because initially there is the formation of the complexes of Ti(IV) with peroxidic compound V, and of ion M(II) with compound Z, both of these complexes being stable complexes and soluble at a basic pH. The clear solution formed by the two complexes provides, on heating, solid particles of the peroxidic precursor comprising M and Ti as follows: the peroxy compound V, which is present in a stoichiometric excess with respect to Ti(IV), is capable of oxidizing, with controlled kinetics, compound Z, with consequent slow release of the M(II) ion, that forms a precipitate by combining the anionic complex of Ti(IV) with the peroxidic compound.

As previously noted, it is essential that the complex solution obtained at point (b) of the process be clear so as to obtain a homogeneous precipitation.

The titanium compound may be any compound capable of forming soluble complexes with peroxidic compound V. In particular, titanium compounds having a valence of 4 may be utilized, including, for example, alcoholates, chlorides, and nitrates. Preferably chlorides or alcoholates are utilized. If an alcoholate is used, the isopropylate or ethylate is preferred.

If titanium compounds having a valence of 3 are utilized, it is necessary to use an excess of peroxidic compound V in order to oxidize the Ti to the higher valence.

Suitable compounds of M(II) include the chlorides, perchlorades and nitrates.

Aqueous solutions of NaOH, KOH, or preferably ammonia may be used as agents to obtain the desired basic pH.

In particular, when $H_2O_2$ is employed as a peroxidic compound, a compound Ti(IV) is utilized as the Ti compound and preferrably a salt of ethylenediaminotetraacetic acid is used as a component Z acting as a complexing agent for M(II).

The peroxidic precursor is precipitated by operating under the conditions described hereinafter.

To the basic solution having a pH of from 9 to 11.5 there is added clear solution of a complex of Ti(IV) with $H_2O_2$. Thereafter there are added, sequentially, the excess of $H_2O_2$, followed by the addition of compound Z, and finally the addition of the solution of M(II). The final concentrations of the various reagents is as follows: $H_2O_2$ from 0.175 to 2.10 molar; Ti(IV) not in excess of $2 \times 10^{-2}$ molar; M(II) not in excess of $2 \times 10^{-2}$ molar; the molar ratio, M(II)/Ti(IV), from 0.8 to 1.2; the molar ratio, Z/M(II) from 1.4 to 2.6 when M(II)=$Ba^{2+}$, from 1.0 to 1.5 when M(II)=$Sr^{2+}$, and from (1.4x+1.0 y) to (2.6 x+1.5 y) when a mixture of $Sr^{2+}$ and $Ba^{2+}$ is used, wherein x is the molar fraction of $Ba^{2+}$ and y is the molar fraction of $Sr^{2+}$ wherein x+y=1.

The final concentrations of both Ti(IV) amd M(II) which preferably are employed are from $2 \times 10^{-3}$ molar to $1 \times 10^{-2}$ molar, and preferably are such that the M(II)/Ti(IV) molar ratio is 1.0.

Organic compound Z is preferably utilized in such amount that the Z/$Ba^{2+}$ molar ration is 1.5 and the Z/$Sr^{2+}$ molar ratio is 1.2.

The final concentration of $H_2O_2$ preferably is from 0.5 to 1.5 molar.

Compounds Z can be added as solids directly to the solution or in the form of aqueous solutions, prior to the addition of $M^{2+}$.

The total concentration of hydrogen peroxide can be attained by adding the excess of $H_2O_2$ either to the reaction medium or to the Ti(IV) starting solution. The clear solution of Ti(IV) complexed with $H_2O_2$ is generally prepared by adding a Ti(IV) compound to an acid (unless $TiCl_4$ is used as the Ti(IV) compound), then $H_2O_2$, and then by adding $H_2O$ until the desired Ti(IV) concentration is obtained.

Alternatively, the stock titanium solution can be prepared by adding a Ti-compound, for example, Ti-alkoxide, to a basic solution of $H_2O_2$ under vigorous stirring and cooling.

It is preferable to operate such that the precipitation time is from 30 minutes to 4 hours, more preferably from 1 hour to 2 hours, inasmuch as under such conditions the reaction is virtually quantitative. The peroxidic precursor precipitation temperature is generally from 30° to 100° C. and preferably from 40° to 70° C. The higher the precipitation temperature, the shorter the time to obtain a quantitative yield. It is possible to operate at atmospheric pressure or at higher pressures. In the latter instance, the time required for the precipitation decreases.

The process according to our invention can be carried out in a batch or a continuous reactor, e.g., a plug-flow reactor.

The peroxidic precursor is converted to the amorphous titanate by operating the reactor at a temperature of at least about 100° C., and preferably at 120° C. In any case, the temperature is such as to permit the rupture of all of the peroxidic bonds and to maintain unaltered the morphology of the precursor. Generally the temperature will be from about 100° C. to 300° C.

The amorphous titanates can be used to obtain crystalline titanates by heating in air at a temperature in excess of 500° C.

Desirably, crystalline titanates maintaining the morphological characteristics of the precursor are obtained by heating the precursor at temperatures of at least about 550° C., under vacuum, for a time sufficint to effect complete transformation to the crystalline phase. Generally, a vacuum of $10^{-2}$ mm Hg will be sufficient.

Temperatures higher than 550° C. may of course be used, in which case, the calcination time ordinarily is shorter. In any event, temperatures of the order of about 550° C. are preferred, so as to avoid powder agglomeration.

As previously noted, generally the peroxidic precursor is calcined until the peroxidic bonds have been eliminated. Thereafter, the temperature of the oven is brought up to 550° C. or to the desired predetermined temperature, at a relatively rapid heating rate, preferably in about 2–4 hours.

With respect to the examples given hereinafter, the crystalline phase is determined by x-ray diffraction. The titanates obtained by heating the precursor to a temperature of at least 100° C., subjected to gravimetric quantitative analysis and to atomic absorption analysis, exhibit a molar ratio M/Ti from 0.6 (±0.04) to 1.10 (±0.04), this ratio being adjustable primarily by means of the concentration of peroxidic compound V.

The morphology of the samples was analyzed using a transmission electron microscope (TEM) and using a scanning electron microscope (SEM).

To the clear reaction solution used for the preparation of the peroxidic precursor, one may also add dispersing or growth-regulating agents which, however, in the case of narrow particle size distribution titanates, do not substantially affect the aggregation but can affect the final diameter of the particles of the titanates obtained. Examples of such agents include, e.g., polyvinyl alcohol, polyethylene glycol, nonionic dextran.

The dispersing agents are dissolved in water, desirably at concentrations of 1 g/liter, and the amount utilized is such that the dispersant in the reaction volume given in the example generally is between 50 and 200 mg.

One may also add triethanolamine to the starting solution at a concentration not in excess of 0.2 molar for concentrations of M(II) and Ti(IV) not in excess of $1.10^{-2}$ molar without obtaining substantial variations in the resulting monodispersed titanates.

Conversely it has been found, and this is a further aspect of the present invention, that one can obtain polydispersed titanates, i.e., wherein the particle size distribution, dw/dn, is in excess of 1.20 but not above 2.0, by operating with different triethanolamine concentrations. Such polydispersed titanates are obtainable by the process described for the monodispersed titanates, but operating in the presence of triethanolamine at low concentrations of out $2\times10^{-2}$ molar and at concentrations of M(II) and Ti(IV) higher than $1\times10^{-2}$ molar for a relatively short time, e.g., of the order of 15 minutes. A polydispersed product is also obtainable by operating at higher concentrations of triethanolamine, i.e., greater than 0.2 molar, in the range of Ti(IV) and M(II) concentrations indicated for the monodispersed titanates. In this case, however, the reaction yields are lower when using the same times as described for the monodispersed titanate.

Generally, for concentrations of Ti and $M^{2+}$ greater than $1\times10^{-2}$ molar and of the order of $2\times10^{-2}$ molar, in order to obtain titanates having a spherical morphology as described, precipitation is carried out in the presence of nucleation-regulating substances such as, for example, amines.

Suitable amines include, for example, triethylamine, propylamine, triethanolamine, and the like. Their preferred concentration is of about 0.1 molar.

The following examples are given to further illustrate the invention.

Preparation of the stock solutions:

All of the reagents utilized are of RPE grade produced by Farmitalia-Carlo Erba, with the exception of $(NH_4)_2H_2EDTA$, which is an RP reagent produced by Fluka. The $H_2O$ used for the dilutions was previously doubly distilled and filtered on a Nuclepore 0.2 $\mu m$ filter.

A: to 16.6 cc of HCl (concentration of 37% by weight) were added 14.7 cc of Ti(IV) isopropoxide (Ti(i-PrO)$_4$), 27.2 cc of $H_2O_2$ 10.3 molar, and 441.5 cc of $H_2O$. The resulting solution has a concentration of Ti(IV) equal to 0.1 molar;

B: 123 cc of $NH_3$ (concentration of 30% by weight) were diluted in 877 cc of $H_2O$, providing a 1.98 molar $NH_3$ solution;

C: 32.6 g of $(NH_4)_2H_2EDTA$ were dissolved in 1000 cc of $H_2O$, providing a 0.1 molar solution of $(NH_4)_2H_2EDTA$;

D: 24.4 g of $BaCl_2 \cdot 2H_2O$ were dissolved in 1000 cc of $H_2O$, providing a 0.1 molar Ba(II) solution;

E: to 26.5 cc of $N(C_2H_4OH)_3$ were added 29.4 cc of Ti(i-PrO)$_4$, 20 cc of $H_2O_2$ (10.5 molar) and 924.1 cc of $H_2O$, thereby obtaining a 0.1 molar Ti(IV) solution.

EXAMPLE 1

To 62 cc of solution B were added, with stirring and in the following sequence, 45 cc of solution A, 45 cc of a 10.3 molar $H_2O_2$ solution, 90 cc of solution C and, gradually, 45 cc of solution D.

To the resulting clear solution, $H_2O$ was added to obtain a final volume of 900 cc.

The pH of the solution, as measured by a pH-meter, was 9.5.

The clear solution was introduced into a non-stirred reactor and heated for 2 hours by a bath maintained at 60° C.

The resulting suspension was filtered on a Millipore filter, and the product collected on the filter was washed to neutrality of the rinsing water and was subsequently dried under vacuum for 8 hours at 110° C.

The yield of $BaTiO_3$ was 90% of the theoretical yield.

The product, when subjected to x-ray analysis, was shown to be amorphous barium titanate and exhibited a Ba/Ti molar ratio of 0.99 as measured by atomic absorption, and a perfectly spherical morphology as shown by TEM and SEM analyses (see FIGS. 1 and 2), with particles having a number average diameter, dn, of 0.21 $\mu m$, a polydispersity index, dw/dn, of 1.06, and a total average axial ratio of 0.95.

The TEM magnification (FIG. 1) was 11,000X. The SEM magnification (FIG. 2) was 30,000X.

Figure 1:
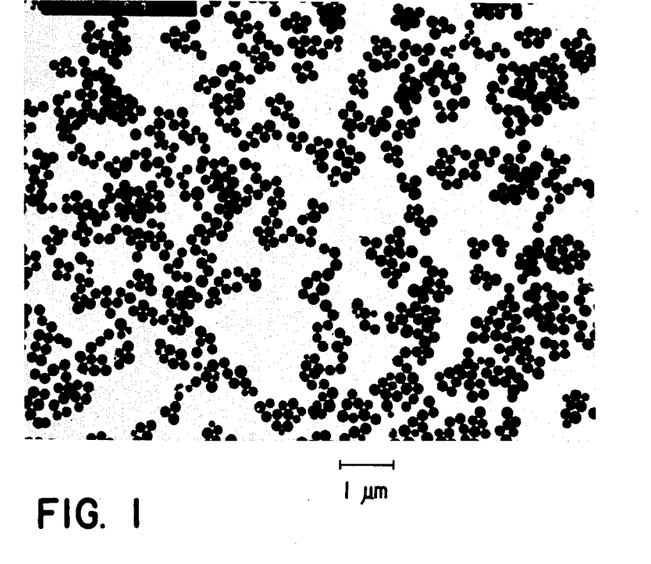
FIG. 1 shows the particles of our invention (see Example 1) at a magnification of 11,000X.
Figure 2:
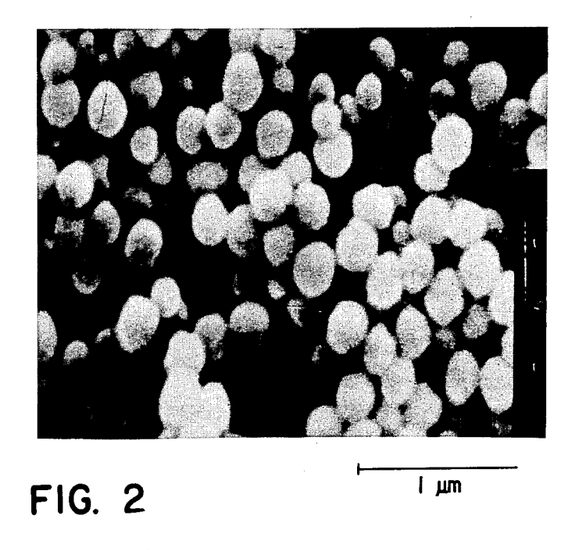
FIG. 2 shows the particles of our invention (see Example 1) at a magnification of 30,000X.

The peroxidic precursor, before heating to 110° C., under TEM and SEM examination exhibited the same morphology of the titanate shown in FIGS. 1 and 2.

EXAMPLE 1A (Comparative Example)

Figure 3:
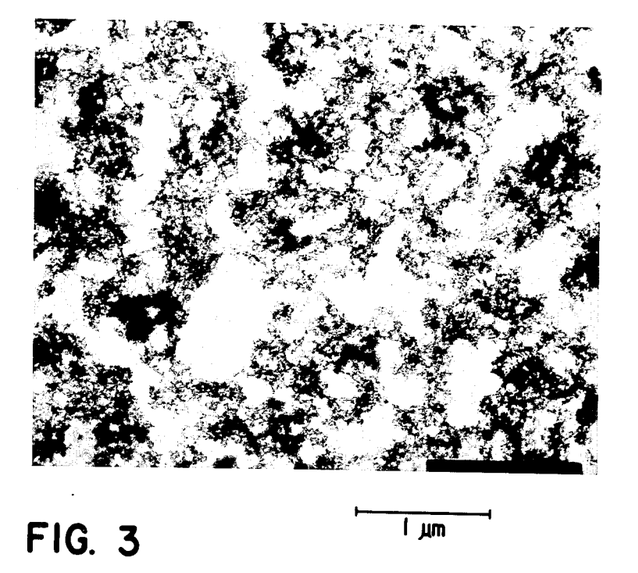
FIG. 3 shows the product obtained by a comparative example (Example 1A) at a magnification of 29,400X.

Example 1 was repeated, but without the addition of solution C, maintaining the final volume of 900 cc. Under these conditions, the starting solution was not clear. The product obtained (peroxidic precursor) exhibited an poorly defined morphology, as shown in FIG. 3. The TEM magnification for FIG. 3 was 29,400X.

EXAMPLE 1B (Comparative Example)

Example 1 was repeated, but using only 20 cc of solution B, maintaining the final volume at 900 cc, thereby obtaining a final solution at a pH of 8.8.

Figure 4:
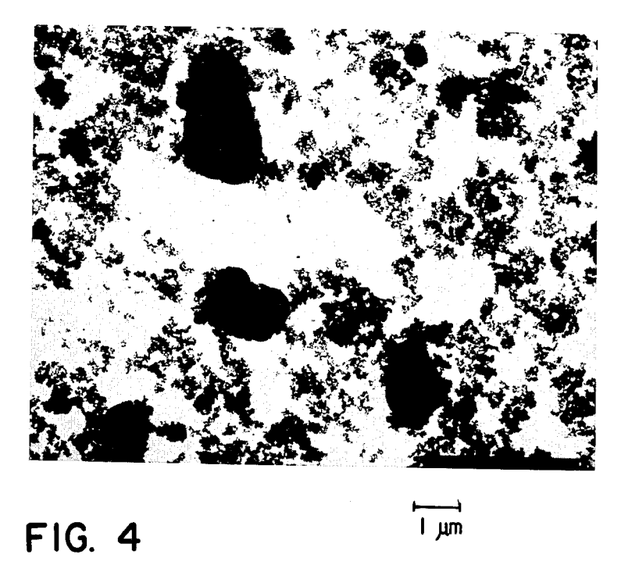
FIG. 4 shows the product obtained by a comparative example (Example 1B) at a magnification of 10,400X.

The result is illustrated in FIG. 4 and shows that a precipitate (peroxidic precursor) having an undefined morphology was obtained. The TEM enlargement for FIG. 4 was 10,400X.

EXAMPLE 2

Example 1 was repeated, however heating the solution for 6 hours. The results were similar to those reported in Example 1, but the yield of $BaTiO_3$ equalled as the theoretical yield.

EXAMPLE 3

Example 1 was repeated, however using 30 cc of $H_2O_2$ (10.3 molar), maintaining the final volume at 900 cc, and heating the solution to 40° C. for one hour.

Figure 5:
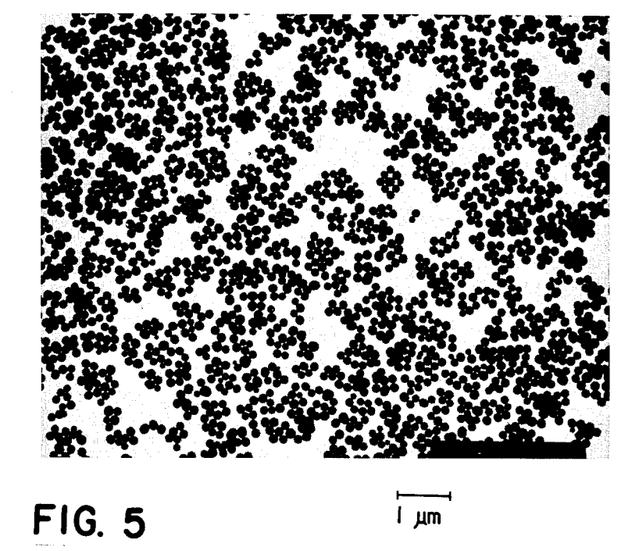
FIG. 5 shows the particles of our invention (see Example 3) at a magnification of 10,700X.

The results are reported in FIG. 5, and show a product with a perfectly spherical morphology, having a dn equal to 0.16 $\mu m$, a dw/dn ratio of 1.08, a total average ratio of 0.93, and a Ba/Ti molar ratio equal to 1.00. The TEM magnification shown in FIG. 5 was 10,700X.

EXAMPLE 4

Example 1 was repeated, but heating the solution to 100° C. for one hour. The results were similar to those of Example 1 with regard to particle size and morphology.

EXAMPLE 5

Example 1 was repeated, but utilizing 153 cc of $H_2O_2$ solution (10.3 molar), maintaining the final volume at 900 cc, and heating to 50° C. for 2 hours.

The resulting product showed a perfectly spherical morphology, a dn equal to 0.15 $\mu m$, a dw/dn of 1.10, a total average axial ratio of 0.93, and a Ba/Ti molar ratio of 1.00.

EXAMPLE 6

Example 1 was repeated, but using 15.4 cc of $H_2O_2$ solution (10.3 molar), and maintaining the final volume at 900 cc.

Figure 6:
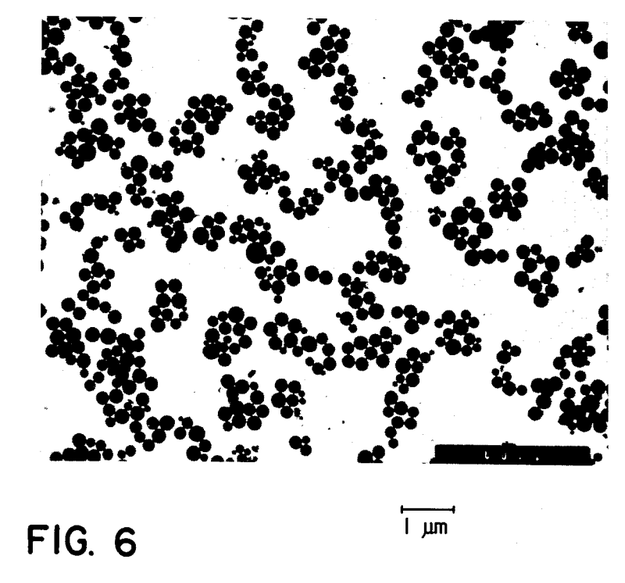
FIG. 6 shows the particles of our invention (see Example 6) at a magnification of 11,000X.

The peroxidic product, when subjected to analysis under TEM, is illustrated in FIG. 6, and revealed a perfectly spherical morphology, having a dn of 0.25 μm, dw/dn equal to 1.15, and a total average axial ratio of 0.94. The Ba/Ti molar ratio was 0.8.

The TEM magnification in FIG. 6 was 11,000X.

EXAMPLE 6A (Comparative Example)

Example 6 was repeated, but using 7.5 cc of the $H_2O_2$ solution (10.3 molar) and maintaining the final volume at 900 cc. A precipitate having an undefined morphology was obtained.

EXAMPLE 7

Example 1 was repeated, but adding to the solution, before heating, 150 cc of a solution 1 g/l of polyethylene glycol 4000 (Fluka product, having an average molecular weight of 4000). The resulting product was essentially made up of particles having a dn equal to 0.16 μm.

EXAMPLE 8

Example 7 was repeated, but using 150 cc of a soluton 1 g/l of non-ionic dextran 6000. (Fluka product, having an average molecular weight of 6000.) The resulting product was made up of particles having a dn equal to 0.45 μm.

EXAMPLE 9

Example 1 was repeated, but utilizing 45 cc of solution E instead of solution A and 47 cc of solution B, and adding water to make up 900 cc volume of final solution. The resulting product essentially was made up of particles having a dn equal to 0.15 μm, a dw/dn of 1.05, and an axial ratio of 0.94.

EXAMPLE 10

Example 9 was repeated, however adding an additional 30 cc of $N(C_2H_4OH)_3$ to the final solution together with water to a final volume of 900 cc.

The resulting product exhibited the following characteristics:

dn=0.08 μm
dw/dn=1.22

Figure 7:
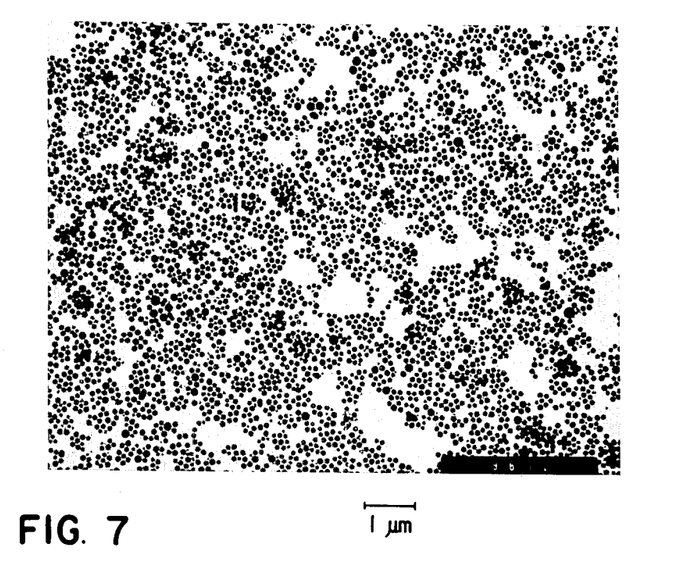
FIG. 7 shows the particles of our invention (see Example 10) at a magnification of 10,700X.

The product is shown in FIG. 7 (TEM, magnification of 10,700X).

EXAMPLE 11

Example 9 was repeated, but utilizing a volume of solution E and a volume of solution D such that the final concentration of Ti(IV) and of Ba(II) was $10^{-2}$ molar, and using the same Z/Ba ratio of Example 9 (Z=$(NH_4)_2H_2$EDTA), and heating for 15 minutes.

There was obtained a non-aggregated and polydispersed product with dw/dn=1.24 and dn=0.17 μm.

EXAMPLE 12

Example 11 was repeated, but instead of using solution E, a solution F was used, which had been prepared in a similar manner as solution E, but using $SrCl_2.2H_2O$ in such amount as to provide a concentration of 0.1 molar Sr(II), and employing 105 cc of solution C, 132 cc of $H_2O_2$ (10.5 molar), bringing the final volume to 900 cc, and reacting for 2 hours.

The resulting product consisted of spherical particles having a dn equal to 0.41 μm.

EXAMPLE 14

Starting solutions were prepared as follows:

(a) 40 cc of $NH_3$, 1.98 molar (solution B); 20 cc of $H_2O_2$, 10.3 molar; 7.35 cc of Ti(i-PrO)$_4$; 182.65 cc of doubly distilled and filtered $H_2O$; thereby obtaining a 0.1 molar solution of Ti;

(b1) 0.1 molar solution of Ba(OH)$_2$ prepared by dissolving, in a $CO_2$-free atmosphere, 31.548 g of Ba(OH)$_2$.8H$_2$O in 1000 cc of doubly distilled water and by filtering the resulting solution on Nuclepore membrane 0.2 μm;

(b2) 0.1 molar solution of Ba(OH)$_2$ prepared by dissolving 31.548 g of Ba(OH)$_2$.8H$_2$O in 1000 cc of a solution containing 32.6 g of $(NH_4)_2H_2$ EDTA.

To 60 cc of solution B were added, in the following order:

100 cc of solution (a)
100 cc of solution (b2)
40 cc of solution C
50 cc of $H_2O_2$, 10.3 molar
650 cc of double distilled filtered $H_2O$.

The solution was aged while stirring (300 rpm) at 60° C. for 2 hours.

The product was washed with water and dried at 110° C. under vacuum of $10^{-1}$ mm Hg.

The dried product was heated at 550° C. for 2 hours, using a 100° C./hr. heating rate, under vacuum of $10^{-2}$ mm Hg.

Figure 10:
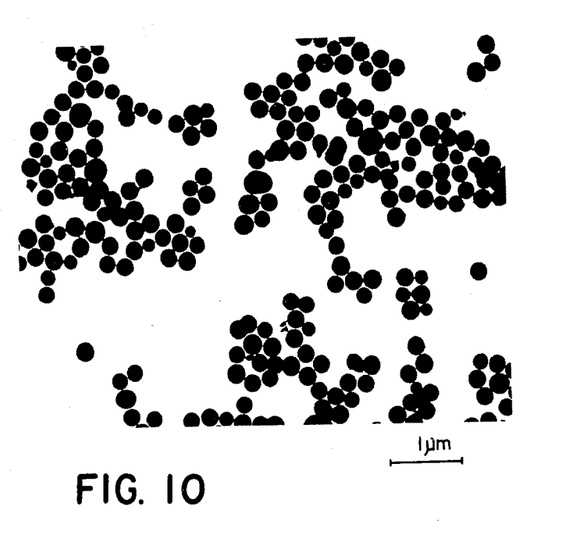
FIG. 10 shows the particles of our invention after calcination (see Example 14) at a magnification of 14,280X.

The resulting product, when subjected to x-ray analysis, was shown to be crystalline BaTiO$_3$. The product after calcination is illustrated in FIG. 10 (TEM analysis, magnification 14,280X), and consists of perfectly spherical, non-agglomerated particles.

EXAMPLE 15

The dried product of Example 1 was subjected to the calcination treatment described in Example 14. The resulting product showed the same morphological and crystalline characteristics as that of Example 14.

EXAMPLE 16

To 150 cc of solution (a) [described in Example 14] were added 12 cc of $NEt_3$ (triethylamine), 150 cc of solution (b2), and 60 cc of solution C.

Aging of the solution and drying of the resulting product were carried out as described in Example 14. The resulting product showed a very similar morphology to that illustrated in FIG. 7.

EXAMPLE 17

Example 1 was repeated using 60 cc of a solution of 0.1 molar DTPA (prepared by dissolving 7.879 g of diethylenetriaminepentacetic acid with 50.5 cc of solution B (1.98 molar $NH_3$) and adjusting the final volume to 200 cc rather than 90 cc of solution C. The final volume of the starting solution was 900 cc and the pH was 9.7.

Figure 11:
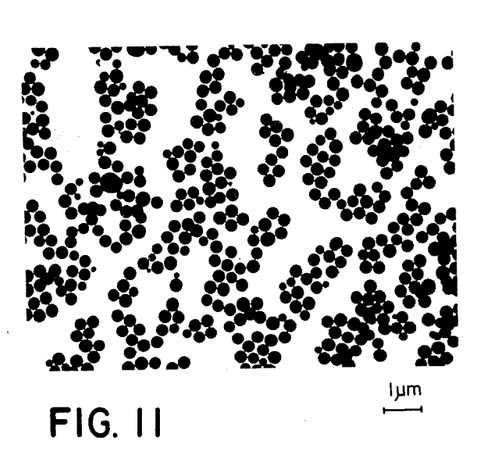
FIG. 11 shows the particles of our invention prior to calcination (see Example 17) at a magnification of 14,350X.

The aging of the solution and the drying of the resulting product were carried out as described in Example 14. The morphology of the resulting product, as determined by TEM, is shown in FIG. 11 (magnification 7,350X).

It will be understood that variations in the foregoing description can of course be made without departing from the spirit and scope of our invention.

We claim:

1. A titanate of barium, strontium, or a mixture thereof, consisting essentially of solid, spherical, non-aggregated particles having a diameter of from 0.05 to 1 µm, having a narrow particle size distribution expressed by a polydispersity index, dw/dn, not in excess of 1.20, wherein dw is the weight average diameter and dn is the number average diameter, said spherical particles having a total average axial ratio, D=a/b, of at least 0.93, wherein b is the maximum diameter of each particle and a is the corresponding orthogonal diameter.

2. The titanate of claim 1, wherein the polydispersity index, dw/dn, is not in excess of 1.10.

3. The titanate of claim 1 wherein the diameter of the spherical particles is from 0.15 to 0.5 µm.

4. The titanate of claim 1, having a purity greater than 98% by weight.

5. The titanate of claim 1 additionally comprising an n-type or p-type doping agent in a concentration not in excess of 0.01% by weight.

6. The titanate of claim 5 wherein the doping agent is Al, Sn, Sb, Nb, Ta, Mn, Fe, or a rare earth element.

7. The titanate of claim 1 wherein the Ba/Ti molar ratio is from about 0.60 to 1.10.

8. A titanate of barium, strontium, or a mixture thereof, consisting essentially of solid, perfectly spherical particles having a diameter of from 0.05 to 1 µm, a particle size distribution, expressed by a polydispersity index, dw/dn, greater than 1.20 but not in excess of 2.00, wherein dw is the weight average diameter and dn is the number average diameter, said spherical particles having a total mean axial ratio, D=a/b, of at least 0.93, wherein b is the maximum diameter of each particle and a is the corresponding orthogonal diameter.

9. The titanate of claim 8, having a purity greater than 98% by weight.

10. The titanate of claim 8, additionally comprising an n-type or p-type doping agent in a concentration not in excess of 0.01% by weight.

11. A process for preparing a titanate of barium, strontium, or a mixture thereof, which comprises the steps of:
(A) homogeneously precipitating a peroxidic precursor comprising Ti(IV) and M(II), wherein M is Ba, Sr or mixtures thereof, said precipitation comprising:
(a) preparing a clear solution at a pH of from 9 to 11.5, which contains a soluble complex of Ti with a peroxidic compound V, a solution of ions $M^{2+}$, wherein M is as previously defined, a compound Z capable of complexing with ion $M^{2+}$ and which may be oxidized by peroxidic compound V to provide decomposition products which are soluble in the solution;
(b) heating the clear solution of step (a) in the presence of an excess of peroxidic compound V, to thereby homogeneously precipitate said peroxidic precursor; and
(B) heating the peroxidic precursor to a temperature of at least 100° C. to obtain an amorphous titanate having the same morphology as that of said peroxidic precursor.

12. The process of claim 11, wherein the peroxidic compound is $H_2O_2$.

13. The process of claim 11, wherein compound Z is an ammonium, sodium or potassium salt of ethylenediaminotetraacetic acid (EDTA), nitrilotriacetic acid (NTA), diethylenetriaminopentaacetic acid (DPTA), hydroxyethylenediaminotriacetic acid (HEDTA), cycloexylenedinitrilotetraacetic acid (CDTA), or the corresponding acid of any said salt.

14. The process of claim 13, wherein said salt is an ammonium, sodium, or potassium salt of EDTA.

15. The process of claim 12 wherein the $H_2O_2$ concentration is from 0.17 to 2.10 molar, the concentration of the Ti and Ba or Sr ions is not in excess of $2 \times 10^{-2}$ molar; the M(II)/Ti molar ratio is from 0.8 to 1.2; the Z/M(II) molar ratio is from 1.4 to 2.6 when M=Ba, is from 1.0 to 1.5 when M=Sr, and is from (1.4 x+1.0 y) to (2.6 x+1.5 y) when M is a mixture of Sr and Ba, x being the molar fraction $Ba^{2+}$ and y the molar fraction of $Sr^{2+}$, and x+y=1.

16. The process of claim 13 wherein the molar concentrations of Ti and M(II) are from $2 \times 10^{-3}$ molar to $1 \times 10^{-2}$ molar and the concentration of $H_2O_2$ is from 0.5 to 1.5 molar.

17. The process of claim 14 wherein the Z/M molar ratio is 1.5 when M=Ba, and is 1.2 when M=Sr.

18. The process of claim 11 which additionally comprises adding a dispersant in the preparation of said clear solution.

19. The process of claim 18 wherein the dispersant is polyethylene glycol, polyvinyl alcohol, or non-ionic dextrane.

20. The process of claim 11, wherein an n-type or p-type doping agent is added to said clear solution.

21. The process of claim 11, wherein said clear solution comprises triethanolamine at a concentration of $2 \times 10^{-2}$ molar when the concentration of M(II) and Ti is greater than $1 \times 10^{-2}$ molar and at a concentration greater than 0.2 molar when M and Ti are at a concentration not in excess of $1 \times 10^{-2}$ molar.

* * * * *